(12) United States Patent
Neelakantan et al.

(10) Patent No.: US 12,533,688 B2
(45) Date of Patent: Jan. 27, 2026

(54) SYSTEM AND METHOD OF ATOMIZING REACTIVE TWO-PART FLUIDS

(71) Applicant: PALO ALTO RESEARCH CENTER INCORPORATED, Palo Alto, CA (US)

(72) Inventors: Ravi Neelakantan, Redwood City, CA (US); Jamie Kalb, Mountain View, CA (US); David Mathew Johnson, San Francisco, CA (US); Joerg Martini, San Francisco, CA (US)

(73) Assignee: XEROX CORPORATION, Norwalk, CT (US)

( * ) Notice: Subject to any disclaimer, the term of this patent is extended or adjusted under 35 U.S.C. 154(b) by 267 days.

(21) Appl. No.: 17/586,446

(22) Filed: Jan. 27, 2022

(65) Prior Publication Data

US 2023/0234083 A1    Jul. 27, 2023

(51) Int. Cl.
*B05B 3/18* (2006.01)
*B01J 13/00* (2006.01)
*B05B 14/20* (2018.01)
*B05B 17/04* (2006.01)

(52) U.S. Cl.
CPC ............. *B05B 3/18* (2013.01); *B01J 13/0095* (2013.01); *B05B 17/04* (2013.01); *B05B 14/20* (2018.02)

(58) Field of Classification Search
CPC . B05B 3/18; B05B 17/04; B05B 14/20; B01J 13/0095
USPC ........................ 239/1; 101/148; 118/258, 621
See application file for complete search history.

(56) References Cited

U.S. PATENT DOCUMENTS

| | | |
|---|---|---|
| 2,291,046 A | 7/1942 | Lange |
| 3,326,122 A | 6/1967 | Wildeman |
| 3,554,815 A | 1/1971 | Otto |
| 3,626,833 A | 12/1971 | Koch |
| 3,649,829 A | 3/1972 | Randolph |
| 3,702,258 A | 11/1972 | Gibbons et al. |
| 3,717,875 A | 2/1973 | Arciprete et al. |
| 3,872,197 A * | 3/1975 | Kato .................. B29C 48/9145 425/149 |
| 3,873,025 A | 3/1975 | Qvarnstrom |
| 3,926,114 A | 12/1975 | Matuschke |
| 4,034,670 A | 7/1977 | Zavodny |

(Continued)

OTHER PUBLICATIONS

Bhat, Pradeep P., "Formation of beads-on-a-string structures during break-up of viscoelastic filaments," Aug. 2010, vol. 6:625-631, Nature Physics, 7 pages.

(Continued)

*Primary Examiner* — Kevin Edward Schwartz
(74) *Attorney, Agent, or Firm* — Miller Nash LLP

(57) ABSTRACT

An apparatus includes a first belt having an external surface, a second belt having an external surface opposite the external surface of the first belt, and a region in which the first belt and the second belt come in contact, a first material dispenser and a second material dispenser to dispense a first material and a second material on the external surface at least one of the first and second belts, and a power source to cause at least one of the first and second belts to move to cause the external surfaces of the first and second belts to contact and then diverge away from each other so that at least one of the first and second materials forms filaments that break up as the belts continue to diverge.

11 Claims, 6 Drawing Sheets

(56) References Cited

U.S. PATENT DOCUMENTS

Figure 3:
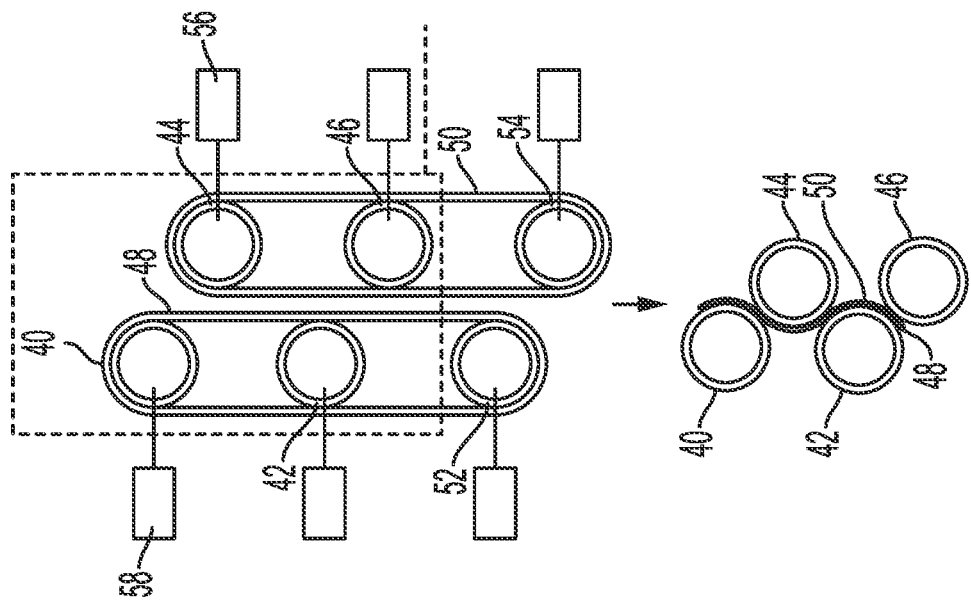

| | | | |
|---|---|---|---|
| 4,211,742 A * | 7/1980 | Kato | B29C 39/38 |
| | | | 264/216 |
| 4,222,059 A | 9/1980 | Crean et al. | |
| 4,301,859 A | 11/1981 | Hollemann | |
| 4,384,296 A | 5/1983 | Torpey | |
| 4,454,813 A * | 6/1984 | Barrois | B41F 31/00 |
| | | | 101/148 |
| 4,559,992 A * | 12/1985 | Bedell | B22D 11/0697 |
| | | | 164/474 |
| 5,055,317 A * | 10/1991 | Hoffman | B05B 13/0207 |
| | | | 427/282 |
| H976 H | 11/1991 | Matta et al. | |
| 5,123,346 A | 6/1992 | Schneider | |
| 5,183,600 A * | 2/1993 | Scher | B29C 41/28 |
| | | | 264/495 |
| 5,217,742 A | 6/1993 | Jones et al. | |
| 5,270,086 A | 12/1993 | Hamlin | |
| 5,314,119 A | 5/1994 | Watt | |
| 5,387,306 A * | 2/1995 | Jarvis | G06K 19/07745 |
| | | | 264/272.17 |
| 5,505,599 A * | 4/1996 | Kemerer | B29C 48/05 |
| | | | 425/371 |
| 5,633,045 A | 5/1997 | Smith et al. | |
| 5,641,544 A | 6/1997 | Melancon et al. | |
| 5,665,295 A * | 9/1997 | Takamoto | B29C 44/5618 |
| | | | 264/172.19 |
| 5,733,608 A | 3/1998 | Kessel et al. | |
| 5,861,195 A | 1/1999 | Bhave et al. | |
| 6,382,524 B1 | 5/2002 | James | |
| 6,412,155 B2 * | 7/2002 | Fleissner | D04H 18/04 |
| | | | 26/18.6 |
| 6,514,571 B1 | 2/2003 | Piccinino, Jr. et al. | |
| 6,554,206 B2 | 4/2003 | Watt | |
| 6,576,861 B2 | 6/2003 | Sampath et al. | |
| 6,622,335 B1 | 9/2003 | Anderson et al. | |
| 6,711,941 B2 | 3/2004 | Braithwaite et al. | |
| 6,934,142 B2 | 8/2005 | Grosse et al. | |
| 7,083,830 B2 | 8/2006 | Minko | |
| 8,132,744 B2 | 3/2012 | King et al. | |
| 8,272,579 B2 | 9/2012 | King et al. | |
| 8,511,251 B2 | 8/2013 | Sato | |
| 8,552,299 B2 | 10/2013 | Rogers et al. | |
| 8,720,370 B2 | 5/2014 | Rebstock | |
| 8,727,101 B2 * | 5/2014 | Chiarini | B65G 45/10 |
| | | | 198/497 |
| 8,742,246 B2 | 6/2014 | Toyoda et al. | |
| 9,364,800 B2 | 6/2016 | Dubief | |
| 9,527,056 B2 * | 12/2016 | Johnson | B05B 17/04 |
| 9,962,673 B2 | 5/2018 | Beck et al. | |
| 9,962,888 B2 * | 5/2018 | Zhang | B05C 9/10 |
| 10,562,059 B2 * | 2/2020 | Beck | B05B 17/04 |
| 2001/0011511 A1 | 8/2001 | Kawabata et al. | |
| 2002/0053320 A1 | 5/2002 | Duthaler et al. | |
| 2002/0116987 A1 | 8/2002 | Braithwaite | |
| 2003/0080475 A1 * | 5/2003 | Bosler | B29C 49/38 |
| | | | 425/371 |
| 2003/0183099 A1 | 10/2003 | De Vroome | |
| 2004/0101619 A1 * | 5/2004 | Camorani | B28B 11/048 |
| | | | 118/308 |
| 2004/0217184 A1 | 11/2004 | Seidel | |
| 2005/0000231 A1 | 1/2005 | Lee | |
| 2006/0035033 A1 | 2/2006 | Tanahashi et al. | |
| 2008/0225087 A1 | 9/2008 | Lee et al. | |
| 2008/0233356 A1 | 9/2008 | Loher et al. | |
| 2009/0014046 A1 | 1/2009 | Yu et al. | |
| 2009/0189932 A1 | 7/2009 | Lee et al. | |
| 2010/0060697 A1 | 3/2010 | Lee et al. | |
| 2010/0154856 A1 | 6/2010 | Yuichi et al. | |
| 2010/0282285 A1 | 11/2010 | Klaus et al. | |
| 2011/0017431 A1 | 1/2011 | Yang et al. | |
| 2011/0150036 A1 | 6/2011 | Lee et al. | |
| 2011/0154558 A1 | 6/2011 | Peter et al. | |
| 2011/0267740 A1 | 11/2011 | Jayaraman et al. | |
| 2011/0290727 A1 | 12/2011 | Van Engelen | |
| 2011/0297617 A1 * | 12/2011 | Mazyar | B01D 33/646 |
| | | | 210/396 |
| 2012/0003345 A1 * | 1/2012 | Curro | B29C 55/18 |
| | | | 425/335 |
| 2012/0103213 A1 | 5/2012 | Stowe et al. | |
| 2012/0227778 A1 | 9/2012 | Leonov | |
| 2013/0033688 A1 | 2/2013 | Stowe et al. | |
| 2013/0087180 A1 | 4/2013 | Stark et al. | |
| 2013/0104756 A1 | 5/2013 | Stowe et al. | |
| 2013/0247788 A1 | 9/2013 | Liu et al. | |
| 2014/0146116 A1 | 5/2014 | Paschkewitz | |
| 2014/0345519 A1 * | 11/2014 | Palumbo | B05B 13/0221 |
| | | | 198/586 |
| 2015/0097906 A1 * | 4/2015 | Beier | B41M 5/0017 |
| | | | 347/103 |
| 2015/0115057 A1 | 4/2015 | Beck et al. | |
| 2015/0119477 A1 | 4/2015 | Beck et al. | |
| 2015/0210009 A1 | 7/2015 | Johnson et al. | |
| 2015/0343407 A1 | 12/2015 | Johnson et al. | |
| 2015/0343468 A1 | 12/2015 | Johnson et al. | |
| 2015/0343477 A1 | 12/2015 | Johnson et al. | |
| 2016/0175874 A1 | 6/2016 | Beck et al. | |
| 2017/0028414 A1 * | 2/2017 | Beck | B05B 7/0075 |
| 2018/0154586 A1 * | 6/2018 | Wang | B29C 64/218 |
| 2018/0297052 A1 | 10/2018 | Beck et al. | |
| 2021/0001513 A1 * | 1/2021 | Zhang | B29B 11/12 |

OTHER PUBLICATIONS

Le, Hue P., "Progress and Trends in Ink-jet Printing Technology," Jan./Feb. 1998, vol. 42:49-62, Journal of Imaging Science and Technology, 16 pages, found at: http://www.imaging.org/ist/resources/tutorials/inkjet.cfm.

Oliveira, Monica S., "Iterated Stretching, Extensional Rheology and Formation of Beads-on-a-String Structures in Polymer Solutions," Jan. 20, 2006, Special Issue of JNNFM on Extensional Flow, MIT, Cambridge, MA, 36 pages.

Owen, M., "Misting of non-Newtonian Liquids in Forward Roll Coating," Jul. 13, 2011, Journal of Non-Newtonian Fluid Mechanics, vol. 166:1123-1128, 6 pages.

Shi, X.D., "A Cascade of Structure in a Drop Falling from a Faucet," Jul. 8, 2004, vol. 265:219-222, Science, 4 pages.

Crowe, Clayton et al.: "Multiphase Flows With Droplets and Particles", CRC Press, LLC, 1998.

Kelly, Ryan T, et al..: "The ion funnel: theory, implementations, and applications", Mass Spectrometry Reviews, vol. 29, 2010, pp. 294-312.

Domnick, et al.: "The Simulation of Electrostatic Spray Painting Process with High-Speed Rotary Bell Atomizers. Part II: External Charging", Part. Part. Syst. Charact. vol. 23, 2006, pp. 408-416, URL: http://www.ppsc-journal.com.

Bailey, Adrian G.: "The Science and technology of electrostatic powder spraying, transport and coating", Journal of Electrostatics, vol. 45, 1998, pp. 85-120.

Marple, A. and Liu, Y.H.: "Characteristics of Laminar Jet Impactors", Environmental Science & Technology, vol. 8, No. 7, Jul. 1974, pp. 648-654.

Chapter 15, "Ink Jet Printing", 14 pages, found at http://www.lintech.org/comp-per/15INK.pdf.

Zhou, Li, et al.: "Highly Conductive, Flexible, Polyurethane-Based Adhesives for Flexible and Printed Electronics," Advanced Functional Materials, vol. 23, p. 1459-1465, wileyonlinelibrary.com.

Sholin, V. et al.: "High Work Function Materials for Source/Drain Contacts in Printed Polymer Thin Transistors," Applied Physics Letters, vol. 92, 2008.

C. Huizenga, H. Zhang, E. Arens, D. Wang: "Skin and core temperature response to partial-and whole-body heating and cooling," Journal of Thermal Biology, vol. 29, Issues 7-8, Oct.-Dec. 2004, pp. 549-558.

L. Francioso, C. De Pascali, A. Taurino, P. Siciliano, A. De Risi: "Wearable and flexible thermoelectric generator with enhanced package," In Proc. SPIE 8763, Smart Sensors, Actuators, and MEMS VI, 876306, May 2013.

(56) References Cited

OTHER PUBLICATIONS

Figure 2:
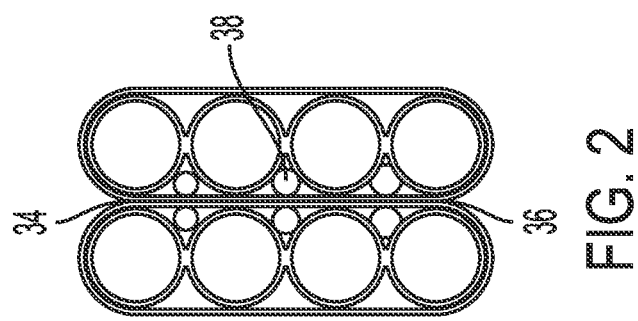

S.-J. Kim, J.-H. Wea and B.-J. Cho: "A wearable thermoelectric generator fabricated on a glass fabric," Energy Environmental Science, 2014.
"Ortho-Planar Spring", BYI Mechanical Engineering Website, URL: http://compliantmechanisms.byu.edu/content/ortho-planar-spring, retrieved from the Internet on Dec. 23, 2014.
Bullis, Kevin, "Expandable Silicon", MIT Technology Review, Dec. 14, 2007, URL: http://www.technologyreview.com/news/409198/expandable-silicon/, retrieved from the Internet on Dec. 23, 2014.
Arens, E., "Partial- and whole-body thermal sensation and comfort—Part II: Non-uniform environmental conditions," Journal of Thermal Biology, vol. 31, Issues 1-2, Jan. 2006, pp. 60-66.
Arens, E., "Partial- and whole-body thermal sensation and comfort—Part I: Uniform environmental conditions," Journal of Thermal Biology, vol. 31, Issues 1-2, Jan. 2006, pp. 53-59.
Hagedorn et al., "Breakup of fluid thread in a confined geometry: droplet-plug, transition, pertubation sensitivity, and kinetic stabilization with confinement," Physical Review, E 69, 2004, pp. 1-3, Figures 2, 5, and 7.
Chen, A., "Dispenser-printed planar thick-film thermoelectric energy generators," J. Micromech. Microeng., 21(10), 2011.
"The Notebooks of Leonardo Da Vinci Arraned Rendered into English and Introduced vol. II" by Edward MacCurdy, 1958, George Braziller, Universal Digital Library, p. 748.
Anna, Shelley, L. et al., "Elasto-capillary Thinning and Breakup of Model Elastic Liquids," J. Rheology, Jan./Feb. 45(1), pp. 115-138 (2001).
Mcclure, Max, "Stanford Researchers' Cooling Glove Better than Steroids—and Helps Solve Physiological Mystery Too", Stanford Report, Aug. 29, 2012, 3 pages, retrieved from the Internet: http://news.stanford.edu/news/2012/august/cooling-glove-research-082912.html, retrieved on Dec. 19, 2014.
Matheson, Rob, "Cool Invention Wins First Place at MADMEC", MIT News Office, Oct. 17, 2013, 3 pages, retrieved from the Internet: http://newsoffice.mit.edu/2013/madmec-design-competition-1017, retrieved on Dec. 19, 2014.
Francioso, L., "Flexible thermoelectric generator for ambient assisted living wearable biometric sensors", Journal of Power Sources, vol. 196, Issue 6, Mar. 15, 2011, pp. 3239-3243.
Vanhemert, Kyle, "MIT Wristband Could Make AC Obsolete", Wired.com, Oct. 30, 2013, retrieved from the Internet: http://www.wired.com/2013/10/an-ingenious-wristband-that-keeps-your-body-at-theperfect-temperature-no-ac-required/, retrieved on Dec. 19, 2014.

* cited by examiner

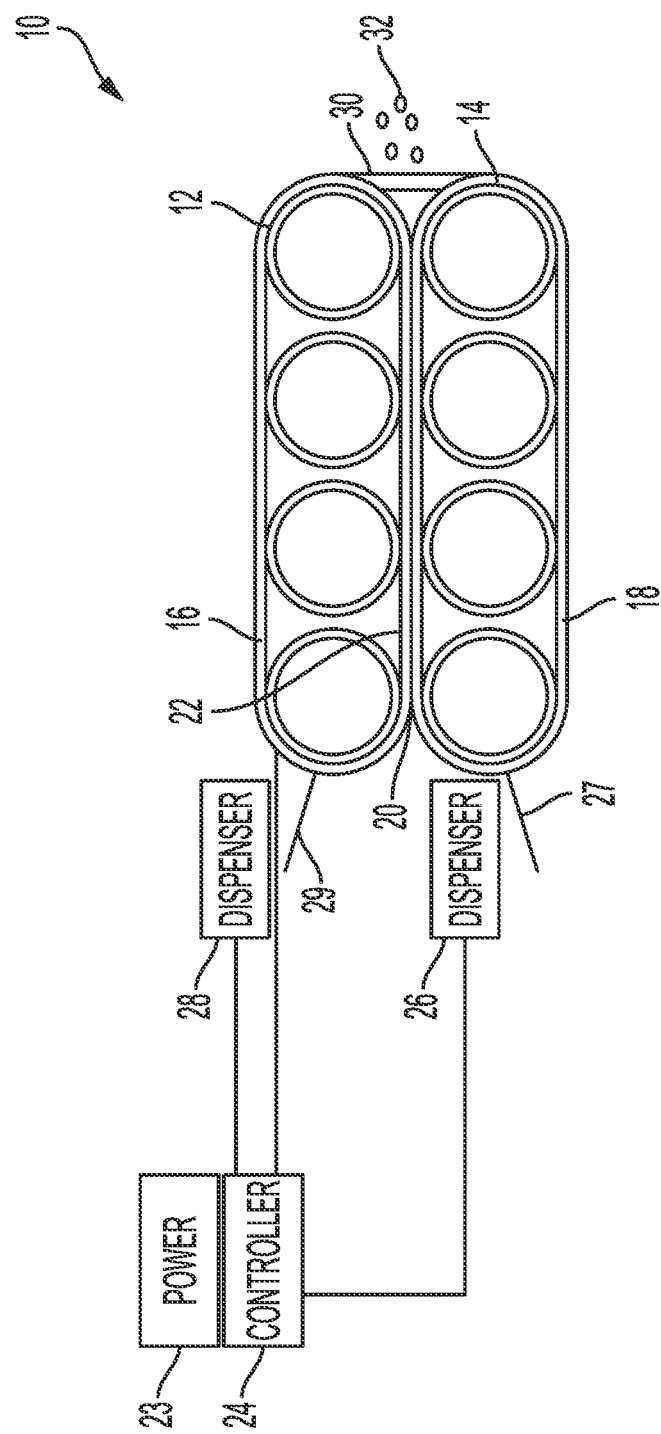

SYSTEM AND METHOD OF ATOMIZING REACTIVE TWO-PART FLUIDS

TECHNICAL FIELD

This disclosure relates to atomizing viscous fluids, more particularly to atomizing two-part fluids using a filament extension atomizer.

BACKGROUND

Spraying or otherwise making a mist from highly viscous fluids presents several challenges. Viscous fluids do not flow easily and any process of breaking them up into particles has to overcome the inherent cohesiveness of the fluid.

One successful solution to this issue lies in filament extension atomizers (FEA) developed by PARC. In the most common of these atomizers, the system introduces the fluid to one or both surfaces of a pair of counter-rotating rollers or other diverging surfaces. As the surfaces come into contact, or near contact in a region called the nip, the fluid attaches to both surfaces. As the surfaces rotate away from each other, the fluid stretches between them, forming filaments. As the surfaces continue to move, the filaments burst into droplets.

Generally, the use of these atomizers involve a non-reactive fluid. The term 'reactive" fluids generally involve at least two different components like an epoxy resin and a hardener, referred to here as a reactive system. Many challenges of trying to spray these fluids exist. To effectively react, the two fluids need to undergo sufficient mixing so the cross-linking agent can react more uniformly, and therefore form a more complete, uniform cross-linked material. Premixing in a chamber, such as a reservoir or pump body, will not work well. The two fluids will react, resulting in clogging of the fluid dispenser as the cross-linking will cause blockages in the dispenser. The cross-linking may also make the dispenser difficult to clean as the fluids may stick to the chamber in which they mixed, even to the point of forming difficult to remove solids. Rapidly reacting fluids may become not sprayable at all.

SUMMARY

According to aspects illustrated here, there is provided an apparatus includes a first belt having an external surface, a second belt having an external surface positioned with the external surface opposite to the external surface of the first belt, with a region in which the first belt and the second belt come in contact, a first set of guide devices arranged inside the first belt, a second set of guide devices inside the second belt, a first material dispenser positioned to allow a first material to be dispensed on the external surface at least one of the first and second belts, a second material dispenser positioned to allow a second material to be dispensed on the external surface at least one of the first and second belts, and a power source to cause at least one of the guide devices in at least one of the first set and the second set of guide devices to cause at least one of the first and second belts to move to cause the external surfaces of the first and second belts contact and then diverge away from each other so that at least one of the first material and the second material forms filaments that break up as the belts continue to diverge.

According to aspects illustrated here, there is provided a method of generating a spray of reactive materials includes dispensing a first material onto at least one of a first belt and a second belt, the first belt and the second belt arranged on a first set of guide devices and a second set of guide devices, dispensing a second material onto at least one of the first belt and the second belt, mixing the first material and the second material by moving the first belt and the second belt through a region in which the first belt and the second belt come in contact with each other to form a mixture, and causing the first belt and the second belt to diverge from each other forming filaments that break into a spray of droplets.

BRIEF DESCRIPTION OF THE DRAWINGS

FIG. 1 shows an embodiment of a system to atomize reactive, two-part fluids.

FIG. 2 shows an alternative arrangement of guide devices in a system to atomize reactive, two-part fluids.

FIG. 3 shows an alternative arrangement of guide devices in a system to atomize reactive, two-part fluids.

FIG. 4 shows an embodiment of an operational system to atomize reactive, two-part fluids.

FIG. 5 shows an embodiment of a pair of belts having different textures.

FIGS. 6-7 show alternative embodiments of a system to atomize reactive, two-part fluids.

DETAILED DESCRIPTION OF THE EMBODIMENTS

Generating sprays or mists from highly viscous materials presents several problems, mostly due to the 'thickness,' or resistance to flow of the material. The particles of the materials tend to have internal friction between layers of the fluid that flow at different rates, making them 'sticky' and hard to separate from other particles of the material. The terms "highly viscous" or "high viscosity" mean a viscosity of over 1 mPa-s (milliPascal-second).

The filament extension atomizer (FEA) technology developed at PARC emerged as a solution to this problem. FEA enables spraying of highly viscous formulations. Thin, low viscosity fluids, with or without a propellant, can be sprayed using pump or trigger sprayers. These methods do not work with higher viscosity fluids, but the FEA has had success in spraying these liquids.

Generally, FEA systems have diverging surfaces, such as a pair of counter rotating rollers. The two surfaces come into contact and then move away from each other. Typically, a fluid is applied to one or both of the surfaces. The surfaces move towards each other and come into contact, or near contact, then diverge from each other. During contact, the fluid sticks to the surfaces, and then as them move away from each other, the fluid forms filaments that stretch between the surfaces until the strain causes the filament to break up into droplets and form a spray.

The discussion here involves using an FEA system for reactive, fluids materials or systems. As used here, the term "reactive" means that a first material, when it comes in contact with a second material, causes a reaction in which the first material causes the second material to cross-link or otherwise change their composition. As used here, the term "cross-link" includes cross-linking, curing, or hardening. Materials that change their composition can include foaming materials that react to form a gas phase that creates voids in the material, materials that chemically react with each other, materials that cause properties such as pH to change, or materials that combine to form other alloys or copolymers. One should note that the first and second materials, individually, may comprise more than one material, such as a cross-linkable material and a buffering agent.

Cross-linkable materials comprise those materials that can form chemical bonds between different chains of atoms of a polymer or other complex molecule. Examples include but are not limited to, a material containing one or more of epoxy resin, silicone resin, or cross-linkable polymers. Examples of materials that can cause other materials to cross-link, referred to here as cross-linking agents, include epoxy hardeners, silicone hardeners, and polymer cross-linkers, such as boric acid.

In a FEA system using two counter rotating rollers the contact area between the rollers is small. In a reactive system, this means that a reactive material spends little time in contact with the other fluid before it is atomized. Since a mixing of these two fluids can take time, the small contact area reduces the ability to increase the contact time without slowing the roller speeds down to a point where spray quality or output is decreased. Furthermore it can be difficult to increase the contact area and time between the two rollers by increasing the size of the rollers since increasing the size of the rollers only has a small impact on the contact area and greatly increases the size of the overall system.

In order to address concerns with using two roller to create filaments, two belts are used to create both a contact area and the diverging surface for the creation of FEA spray. Using belts as the diverging surfaces allows a system to be created with a smaller footprint, but with a large contact area to encourage mixing of the two fluids to form a reactive solution. This allows compact FEA systems with a long contact area, but still capable of running at high surface speeds to create filaments that breakup and meet output demands from an application.

In the case of using belts as the diverging surfaces, the rollers or other guide devices take on a different role than being the diverging surfaces themselves. This separates the guide devices from being the diverging surfaces. As used here, the term "guide device" means any device that moves, or just directs, the belts. The guide devices may cause the belts to move, such as powered rollers, including those mounted on a shaft, connected to motors that cause the rollers to spin. Examples include rollers, and rollers with sprockets. The belt could be a timing belt. These then in turn cause the belt to move. Other types of guide devices may take the form of more passive devices, such as rollers that only move because the belt causes the rollers to spin, or even as simple as a pin or other structure that merely directs the belt in a particular direction.

Guide devices can take a wide range of shapes and configurations. They can be smooth rollers that are mounted on a shaft. The shaft is configured to a bearing system that allows the roller and shaft assembly to freely rotate. Guide devices such as rollers can also be configured so that there is a bearing between the roller and a fixed shaft, this is commonly known as an idler. In addition to smooth rollers, the guide device can be a toothed gear or other substantially circular shape with features to contain and guide a belt. In addition to substantially circular roller-like shapes, rigid shapes that a belt is allowed to freely glide over or past can be used to create geometries not otherwise realizable with circular features. These shapes may include triangular, rectangular, square, etc. Stationary, or passive, guide devices can include features that help constrain motion of the belt in a direction other than the linear velocity of the belt. This can include guide rails, pins, or grooves. Additionally, the guides can be eccentrically mounted around an axis of rotation so that as the belt moves through and around the device the belt moves against the opposing belt.

FIG. 1 shows an embodiment of a system 10 to generate a spray from a reactive system. The system comprises an FEA components of two sets of guide devices, in this case rollers, a first set 12 and a second set 14. Each set of guide devices reside inside a belt, like the set of guide devices 12 that reside inside the belt 16, and the set of guide devices 14 that reside inside belt 18. The two dispensers 26 and 28 dispense their materials on at least one of the sets of guide devices in the area of 20. Each dispenser could dispense its material onto separate belts, both onto one belt, or both onto both belts. However the materials are dispensed, they enter the region between the two belts where they come into contact. In one embodiment, the dispenser may comprise a slot-die dispenser and a doctor blade, such as 27 and 29.

These materials then mix in that region. The guide devices are arranged to form areas of high pressure such as 20, and areas of low pressure such as 22. These alternating regions assist with the mixing of the materials to form a mixture. As the belts move, as shown in the figure they would both move left to right, and then diverge. Their divergence causes the mixture to form filaments 30, that will eventually break up into droplets such as 32. This is discussed in one more issued patents, such as U.S. Pat. No. 9,962,673, "Methods and Systems for Creating Aerosols," issued May 8, 2018, and its related cases.

Using belts in place of a single pair of counter rotating rollers allows for adjustments that would not otherwise be possible. The system controller could move the guide devices to extend the length of the region in which the surfaces are in contact. In addition, the controller may control the speed, or pressure, of the belts to control the amount of time the materials mix. Generally, the controller 24 manages the operation of the dispensers 26 and 28, and the guide devices that move the belts. The controller may control any number of guide devices from one to all. Controlling one of the guide devices may cause one of the belts to move, which, because of the friction between the belts, may cause the other belt to move. A power source 23, such as a battery, AC power from the grid, etc., provides the impetus to the guide device or devices the move the belts, possibly by a motor or other drive.

Other configurations of the belts and guide devices are also possible, and may take up less space. FIG. 2 show the FEA component comprising the two sets of rollers in a different orientation. In this orientation the fluids would be applied at 34 and the filaments and spray would occur at 36. This embodiment may include supplemental guide devices such as 38. The supplemental guide devices may create more or longer regions of high pressure. One should note that "high" pressure and "low" pressure are relative each other.

FIG. 3 shows an alternative embodiment of the FEA components, in which the guide devices for each belt are offset from each other. As used here, the term "offset" means that the rollers alternate compared to the opposing guide device in opposite set. In FIG. 3, the first guide device 40 is offset laterally from the first guide device 44 in the opposite set. The configuration of guide devices as in FIGS. 1 and 2 may be referred to here as a "linear" configuration, where the guide devices used for each belt are in a line of close proximity to each other. Similarly, guide device 42 is offset from its counterpart guide device 46, and guide device 52 is offset from guide device 54.

In the embodiment of FIGS. 1-3, the rollers may be fixed into the position shown at the configuration of the system. Alternatively, the first configuration of FIG. 3, may include actuators attached to at least some of the guide devices, such as 58 and 56. The actuators could then move the guide devices near each other to the second configuration shown in FIG. 3. Alternatively, the second configuration shown in FIG. 3 could be the way the guide devices are configured. The regions of high pressure such as 48 and low pressure such as 50 are arranged differently than other embodiments.

Figure 4:
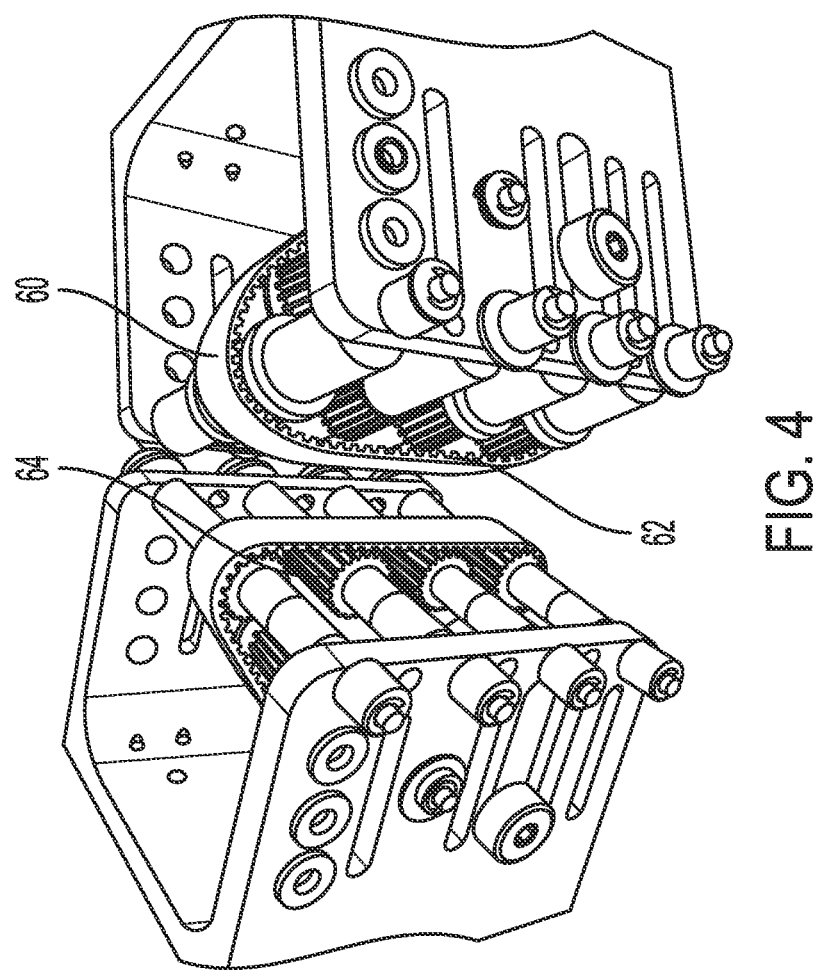

FIG. 4 shows a drawing of an operable system. In this system, the belts are timing belts. A timing belt such as 60 generally differs from a regular belt in that it has teeth, and the teeth such as 62 may match with the rollers such as 64. This allows for precise control of the motion of the belt with regard to time. The belts could both move at the same speed, or one could move at a faster rate than the other to enhance mixing.

Figure 5:
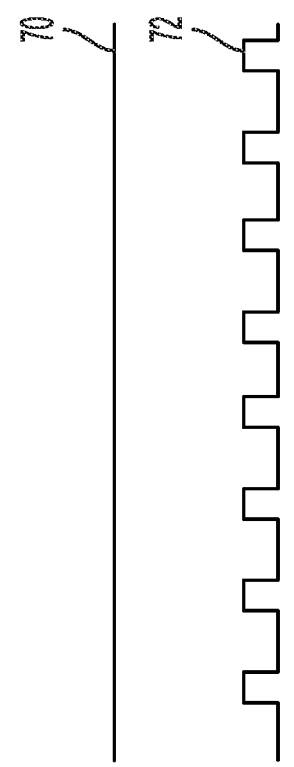

Other method of enhancing mixing may involve other differences in the belts, in addition to moving them at different speeds. As shown in FIG. 5, one belt 70 may have a smoother surface than the belt 72, which may have a rough or textured surface. In addition, the two belts may be held at different voltages if the two components have different dielectric constants.

Figure 6:
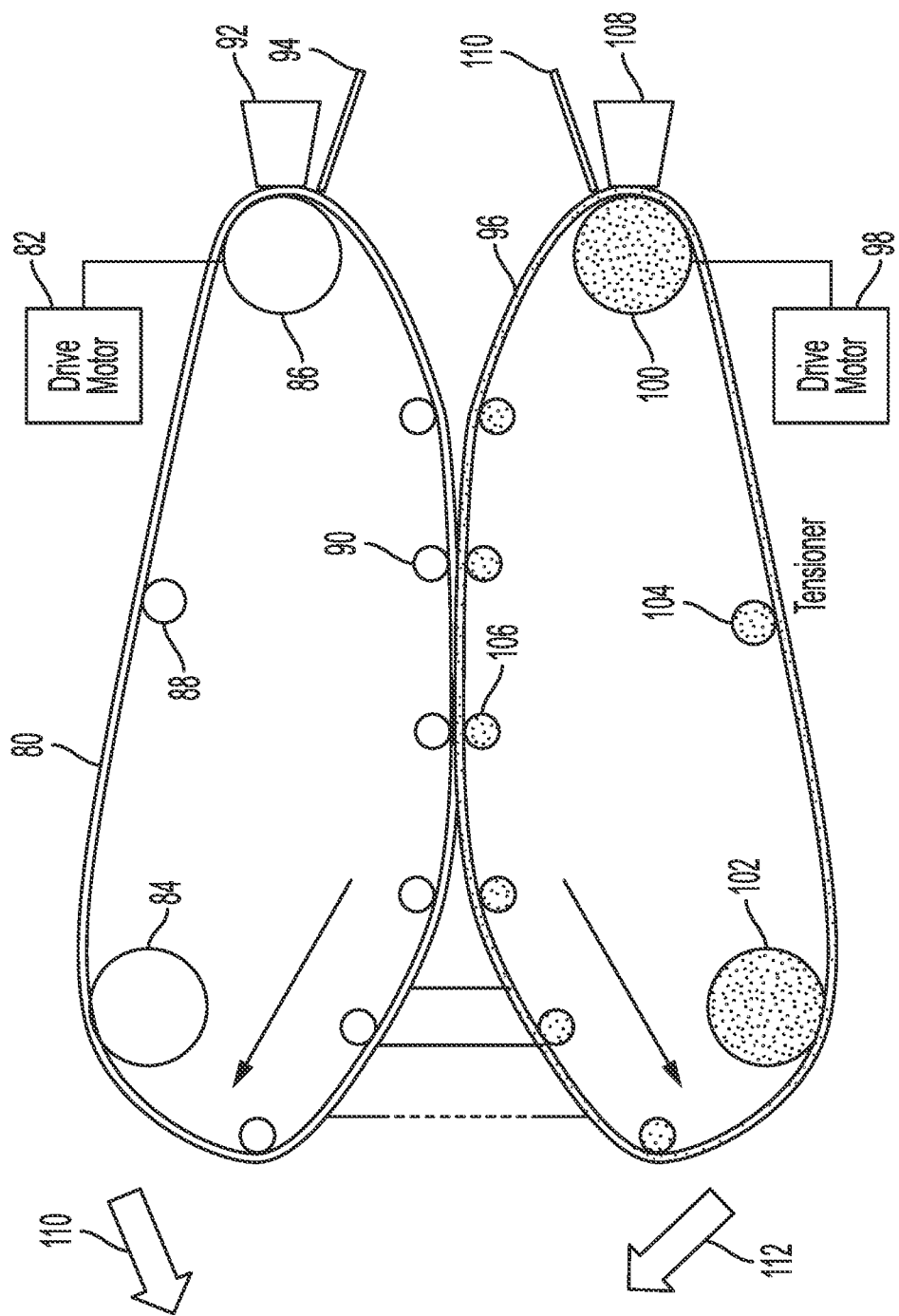
Figure 7:
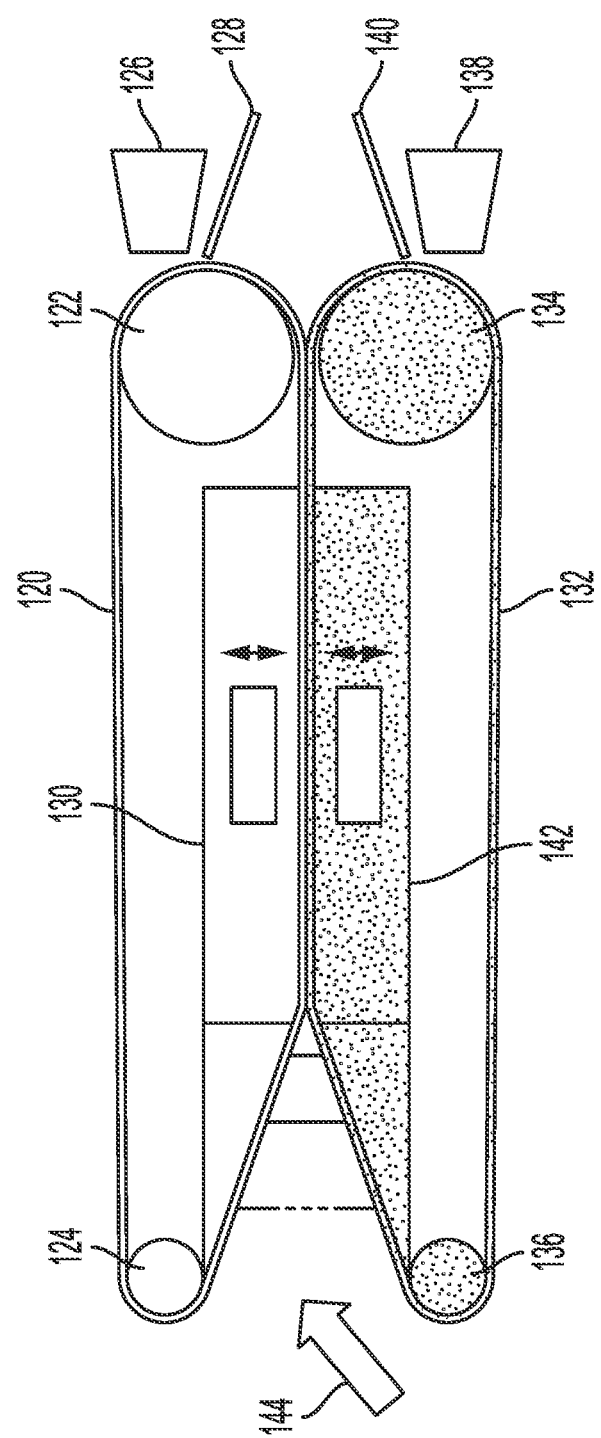

Other variations of guide devices, belts and their shapes are of course possible. FIGS. 6 and 7 show alternative configurations of the system. In FIG. 6, the upper belt 80 has a drive motor 82, connected to at least one of the two guide devices 84 and 86 that may comprise rollers.

Other guide devices such as 90 may comprise passive or active devices that cause the first belt to come into contact with the second belt and then diverge as shown by the arrow. A tensioner 88 may maintain the appropriate the appropriate tension. The dispensers in this embodiment comprise slot-die coaters 92, 108 and doctor blades 94 and 110. The second belt 96 has a drive motor 98, connected to one or more of the rollers 100 and 102. The other guide devices such as 106, and a tensioner 104.

This embodiment includes a harvesting air flow. While not shown in previous embodiments, any of the other embodiments may include harvesting air flows. The harvesting air flows flow in the directions shown by arrows 110 and 112. The harvesting air flows direct the droplets in a predetermined direction. While shown flowing in a particular direction as in FIG. 6, the harvesting air flow could be directed wherever desired.

FIG. 7 shows an alternative embodiment in which a first belt 120 and a second belt 132 move to come into a region in which they are in extended contact. The guide devices 122 and 124, guide the first belt 120. An actuator 130 move in the direction of the arrow shown to cause the belt to move towards the other belt 132. The other belt 132 has guide devices 134 and 136, as well as an actuator 142. The dispensers 126 and 140 have corresponding doctor blades 128 and 138, if that type of dispenser is being used. The harvesting air flow travels in and out of the plane of the page as shown by arrow 144.

In this manner, using belts instead rollers provides better mixing, and more opportunities to control the rate and length of the mixing region. This overcomes the issues with mixing materials in a reactive system, while also overcoming issues with viscosity.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus, comprising:
a first belt having an external surface;
a second belt having an external surface positioned opposite to the external surface of the first belt, with a region in which the first belt and the second belt come in contact;
a first set of guide devices arranged inside the first belt;
a second set of guide devices inside the second belt;
a reactive first material;
a first material dispenser containing the reactive first material positioned to allow the reactive first material to be dispensed on the external surface of the first belt;
a second material reactive with the reactive first material, wherein the reactive first material causes the second material to change chemical composition when the reactive first material and the second material are mixed;
a second material dispenser containing the second material positioned to allow the second material to be dispensed on the external surface of the second belt, wherein the region in which the first and second belts come in contact is of a length sufficient to cause mixing of the first and second materials to form a reactive system;
a power source to cause at least one of the guide devices in at least one of the first set and the second set of guide devices to cause at least one of the first and second belts to move to cause the external surfaces of the first and second belts to contact and then diverge away from each other so that at least one of the reactive first material and the second material forms filaments that break up as the first and second belts continue to diverge; and
a controller configured to control at least one of the belts to control an amount of time the first material and second material are mixed.

2. The apparatus as claimed in claim 1, wherein the controller is connected to at least one guide device of the first and second set of guide devices, the first material dispenser and the second material dispenser.

3. The apparatus as claimed in claim 1, wherein the first set of guide devices comprises a first set of rollers arranged linearly within the first belt and the second set of guide devices comprise a second set of rollers arranged linearly within the second belt in parallel with the first set of rollers.

4. The apparatus as claimed in claim 1, wherein the first set of guide devices and the second set of guide devices are offset from each other.

5. The apparatus as claimed in claim 1, wherein the first set of guide devices comprises a first set of rollers having two, three or four rollers and the second set of guide devices comprises a second set of rollers with a same number of rollers as the first set of rollers.

6. The apparatus as claimed in claim 1, wherein the first belt and the second belt comprise timing belts.

7. The apparatus as claimed in claim 1, wherein the first belt and the second belt have different textures, with one belt having a rougher texture than the other.

8. The apparatus as claimed in claim 1, wherein at least one of the first belt and the second belt is adjustable as to control a length of the region in which the first belt and the second belt come in contact.

9. The apparatus as claimed in claim 1, wherein at least one of the external surface of the first belt and the external surface of the second belt has a texture.

10. The apparatus as claimed in claim 1, wherein the first set of guide devices and the second set of guide devices are positioned such that when the first and second belts move, alternating regions of high and low pressure form.

11. An apparatus, comprising:
- a first belt having an external surface;
- a second belt having an external surface positioned opposite to the external surface of the first belt, with a region in which the first belt and the second belt come in contact;
- a first set of guide devices arranged inside the first belt;
- a second set of guide devices inside the second belt;
- a reactive first material;
- a first material dispenser containing the reactive first material positioned to allow the reactive first material to be dispensed on the external surface of the first belt;
- a second material reactive with the reactive first material, wherein the reactive first material causes the second material to cross-link when the reactive first material and the second material are mixed;
- a second material dispenser containing the second material positioned to allow the second material to be dispensed on the external surface of the second belt, wherein the region in which the first and second belts come in contact is of a length sufficient to cause mixing of the first and second materials to form a reactive system;
- a power source to cause at least one of the guide devices in at least one of the first set and the second set of guide devices to cause at least one of the first and second belts to move to cause the external surfaces of the first and second belts to contact and then diverge away from each other so that at least one of the reactive first material and the second material forms filaments that break up as the first and second belts continue to diverge; and
- a controller configured to control at least one of the belts to control an amount of time the first material and second material are mixed.

\* \* \* \* \*